May 15, 1951  S. J. NEEDS  2,553,107
GUIDE BEARING
Filed April 1, 1947
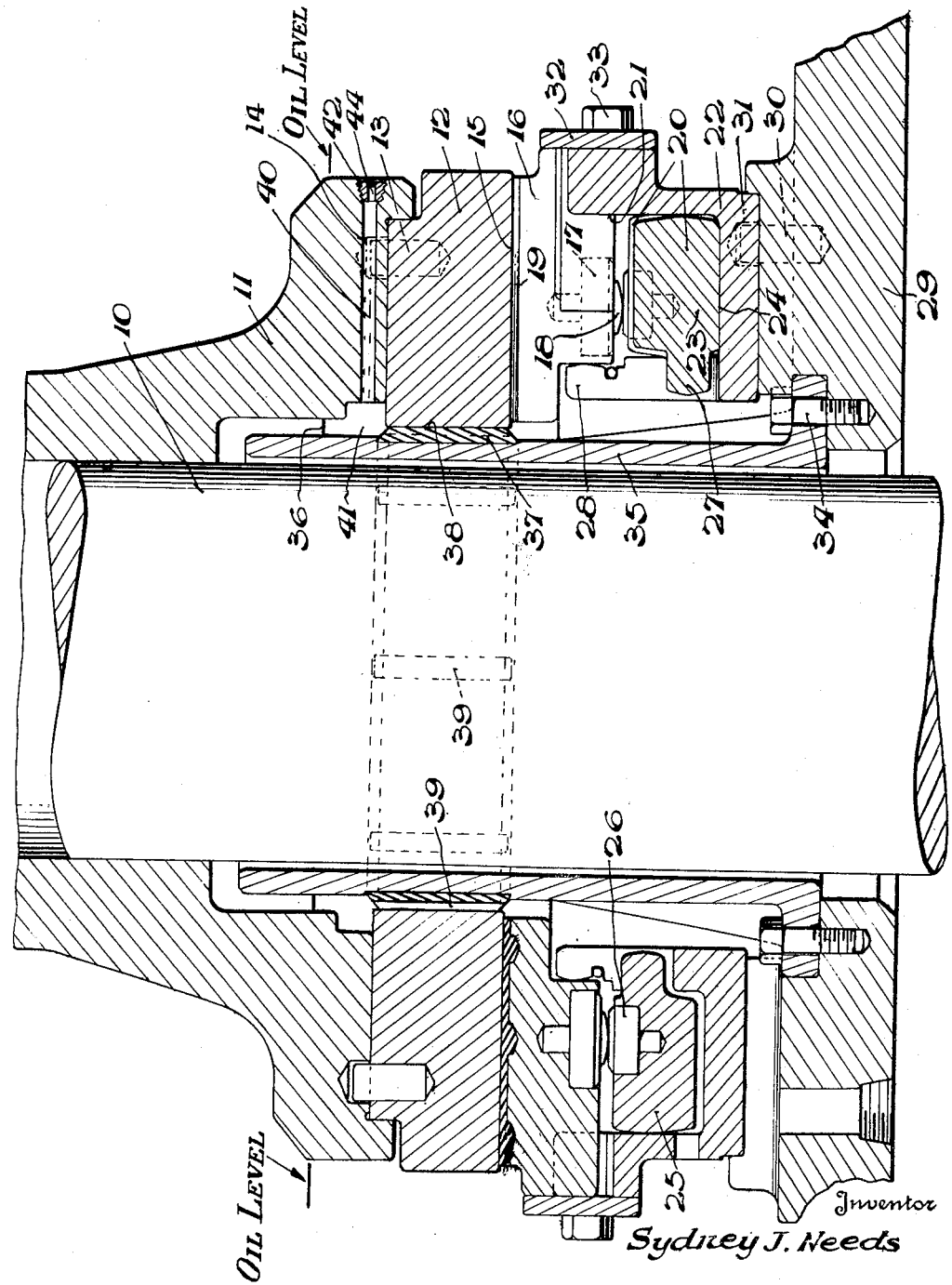
Inventor
Sydney J. Needs
By Cameron, Kerkam + Sutton
Attorneys Patented May 15, 1951

2,553,107

UNITED STATES PATENT OFFICE 2,553,107

GUIDE BEARING

Sydney J. Needs, Philadelphia, Pa., assignor to Kingsbury Machine Works, Inc., Philadelphia, Pa., a corporation of Delaware Application April 1, 1947, Serial No. 738,587

4 Claims. (Cl. 308—168)

This invention relates to a guide bearing, and more especially to a guide bearing having particular utility for association with a thrust bearing.

It has heretofore been proposed to provide a thrust block, or a runner attached thereto, with an exteriorly disposed, surrounding, radial bearing member to cooperate therewith as a guide bearing. A guide bearing so constructed and arranged develops friction in proportion to the rubbing speed and to the area of the external peripheral surface on the rotating block or runner constituting the rotatable bearing surface of such guide bearing. Furthermore, as the block or runner, to the extent that it functions as a guide bearing, is confined within the enclosure provided by the stationary guide bearing member, dissipation of heat from the block or runner is retarded, so that it is likely to expand to a relatively greater extent than the surrounding stationary guide bearing member which is air cooled at its outer face, with a resulting tendency to diminish the running clearance between the radial bearing surfaces and even a danger of seizing. Such an exterior guide bearing construction also interferes with ready access to the thrust bearing members, it adds to the overall radial dimensions of the bearing unit, and it requires a heavier, more bulky and more expensive construction of the bearing housing to afford a support for the stationary guide bearing member.

It is an object of this invention to provide an improved guide bearing wherein the guiding function is adequately effected but both the area of the guide bearing surfaces and the speed of their relative movement are materially reduced so as to decrease friction losses.

Another object of this invention is to provide an improved device of the type characterized which minimizes the likelihood of a reduction in running clearance during the operation of the bearing and therefore eliminates any danger of seizing at the guide bearing surfaces.

Another object of this invention is to provide an improved device of the type characterized which facilitates access to the thrust bearing members.

Another object of this invention is to provide an improved device of the type characterized which enables the overall radial dimensions of the bearing unit to be reduced.

Another object of this invention is to provide an improved device of the type characterized wherein the guide bearing function may be adequately effected without the increase of size, weight and cost incident to the use of an external guide bearing.

Another object of this invention is to provide an improved device of the type characterized wherein the guide bearing surfaces are less likely to be injured during shipping and handling.

Another object of this invention is to provide an improved device of the type characterized which facilitates lubrication and cooling of the guide bearing members.

Another object of this invention is to provide an improved device of the type characterized which is of increased simplicity and compactness of construction.

Other objects will appear as the description of the invention proceeds.

The invention is capable of receiving a variety of mechanical expressions only one of which has been illustrated on the accompanying drawing, and it is therefore to be expressly understood that the drawing is for purposes of illustration only, and is not to be construed as a definition of the limits of the invention, reference being had to the appended claims for that purpose.

The drawing illustrates somewhat diagrammatically a combined thrust and guide bearing embodying the present invention.

Referring in detail to the accompanying drawing, any suitable shaft 10 has mounted thereon, and secured thereto in any suitable way, a thrust block 11 of any appropriate construction. Secured to said thrust block 11 in any suitable way for rotation therewith is a runner 12 of any appropriate construction, the runner being shown as provided with dowels 13 engaging in recesses 14 in the under face of the thrust block. Cooperating with the bearing face 15 of said runner are stationary thrust bearing members of any suitable construction, here shown as in the form of the well known Kingsbury type of thrust bearing including a plurality of shoes 16 provided with inserts 17 having spherical faces 18 on which they are mounted to tilt both radially and circumferentially with respect to the bearing and thereby form wedge-shaped oil films between the bearing faces 19 of said shoes and the bearing face 15 of the runner.

The shoes 16 may be mounted in any suitable way, as on adjusting screws, a spherical equalizing ring, a series of bridged equalizing blocks, etc. As illustrated, a series of bridged equalizing blocks 20 is mounted within the channel-shaped chamber 21 of a cage member 22, alternate blocks 23 being tiltably mounted on the bottom inner face 24 of said cage, while the intermediate bridging blocks 25, as shown more particularly at the left of the drawing, are provided with inserts 26 on which the spherical faces 18 of the inserts 17 are mounted. Rotation of the equalizing blocks is prevented by providing the same with radially extending lugs 27 which engage in slots 28 formed in the inner wall of the cage 22. Cage 22 is stationarily mounted on any suitable base 29 and prevented from rotation by dowels 30 engaging in suitable recesses 31 in the base of the cage. Cage 22 is also shown as carrying a retaining ring 32 secured thereto in any suitable way, as by bolts 33, in surrounding relationship to the shoes 16 so as to prevent radially outward movement thereof.

Base ring 29 has mounted thereon in closely surrounding relationship to the shaft 10, and secured thereto in any suitable way as by bolts 34, an oil retaining sleeve 35 which extends above the surface 36 of the oil in the oil well in which the thrust bearing surfaces are submerged. As so far described, the thrust bearing is a well known form of Kingsbury thrust bearing of which the details constitute no part of the present invention. Furthermore, while one particular form of thrust bearing has been illustrated and described with considerable detail it is to be expressly understood that the invention is not limited to use of this particular form or type of thrust bearing, as the invention can be applied to thrust bearings of a wide variety of constructions and types, and also to equivalent blocks independently of a thrust bearing, as will be apparent to those skilled in the art.

In thrust bearings of the character referred to it is conventional to provide an oil retaining sleeve 35 mounted on the base 29 to provide the inner periphery of the oil well in which the thrust bearing surfaces run submerged. In conformity with the present invention this oil retaining sleeve 35 is made of somewhat heavier construction than is conventional when its sole purpose is to provide the inner periphery of the oil well, so as to give it the requisite rigidity and strength for supporting the stationary part of a guide bearing. Sleeve 35 extends interiorly of the rotatable thrust bearing member, and mounted on said sleeve in any suitable way is radial guide bearing means 37 of any suitable construction, said means providing a radial guide bearing surface radially spaced from the peripheral surface of the sleeve 35 and disposed in radial alignment with any suitable radial guide bearing surface provided on the thrust block or the runner, here illustrated as a bearing surface 38 at the inner periphery of the runner 12. Said guide bearing surfaces are disposed below the level of the oil in the well, and radial bearing member 37 is provided with any suitable number and character of oil grooves 39, here shown as extending parallelly to the axis of the shaft 10 and of uniform width, but for a purpose to be explained said grooves may be circumferentially inclined in either direction or said grooves may taper lengthwise.

Above said guide bearing surfaces the thrust block 11 is provided with any suitable number of passages 40 extending therethrough from the inner oil space 41 to the outer portion of the oil well, said passages 40 being disposed radially with respect to the bearing or they may be inclined with respect to the radius for a purpose to be explained. Said passages 40 which act as a centrifugal pump may be made of any desired size for controlling the oil circulation from the inner portion 41 of the well to the outer portion of the well, or as shown said rate of oil circulation may be controlled by introducing into the outer threaded extremities of said passages 40 threaded plugs 42 having apertures 44 of a size selected to predetermine the oil circulation.

Oil from the underside of the bearing shoes will rise through the grooves 39 of guide bearing member 37 into the space 41 from which it will be removed through the passages 40 under the action of centrifugal force, the rate of removal depending upon the number and disposition of the passages 40 and the size of said passages or of the outlet apertures 44. The rate of flow of oil to the space 41 can be controlled by using axially disposed grooves or grooves inclined in the direction of or opposite to the direction of rotation of the shaft 10, or if the shaft is designed to rotate in both directions, the grooves may be suitably tapered. Thereby, by suitably selecting the form and direction of the oil grooves in conjunction with the number, disposition and size of the passages 40 or the outlets 44 therefrom, the rate at which the oil will circulate through the guide bearing and be returned to the outer portion of the oil well can be nicely predetermined. In any event, the sizes of the passages 40 or the outlets 44 therefrom are such that said passages 40 will not remove oil from the space 41 more rapidly than it is supplied to said space 41 through the grooves 39 in the bearing member 37. Thereby the inlets to said passages 40 as well as the guide bearing surfaces are always submerged in oil so that the oil does not become aerated by air drawn into the same under the centrifugal pumping action of the passages 40.

Guide bearing member 37 is preferably tapered at its opposite edges as shown, such taper forming a guide for centering the runner as it is lowered into position. While oil grooves 39 are shown only in the member 37, the rotatable guide bearing surface may be provided with comparable oil grooves either alone or in combination with oil grooves in the stationary bearing surface.

As the rotation of the shaft 10 normally produces a circulation of air between the shaft and the oil retaining sleeve 35, the stationary member 37 of the guide bearing is adequately cooled. As the stationary member of the guide bearing is surrounded by the rotatable thrust bearing members which are likely to attain a higher temperature, the tendency is for the rotatable bearing members to expand away from rather than toward the stationary guide bearing member so that danger of diminution of the running clearance when the bearing heats up, or even seizure of the guide bearing surfaces, is substantially eliminated. Indeed, the bearing clearance may be decreased owing to the elimination of the foregoing danger. As the area of the guide bearing surface is now determined by the diameter of the inner periphery of the runner or thrust block rather than the outer diameter, the area of the guide bearing surfaces is materially reduced as is also their relative rubbing speed for any given R. P. M., with resultant diminution of friction losses and consequent heat losses that must be taken care of by the cooling system provided for the bearing whereby the cooling system may be made of smaller capacity.

As the guide bearing surfaces are disposed interiorly of the runner or thrust block they are protected from injury during transportation or handling, while the disposition of the guide bearing surfaces within the thrust block or runner results in a more simple and compact construction. At the same time the omission of guide bearing members at the outer periphery of the thrust block or runner facilitates access to the thrust bearing members; and the bearing unit as a whole is of materially reduced diameter because of the absence of the surrounding guide bearing members and the necessary support therefor. Thus, a substantial saving in weight and cost is effected because the smaller size and weight of the stationary guide bearing member means that the requisite support therefor may also be made lighter and less expensive. Thus the construction of the bearing unit is simplified because fewer parts are required, and the housing of the bearing may be made of simplified construction inasmuch as it does not have to support guide bearing members.

Assembly and disassembly of the unit is also facilitated by reason of the absence of the exterior guide bearings. Alignment of the bearing with the associated machinery is facilitated because the bearing carried by the oil retaining sleeve can be used as a reference point for aligning associated guide bearings, and correction for misalignment can be readily effected by shifting and doweling the parts in proper position. Furthermore, the construction disclosed enables a nice predetermination of the rate at which the lubricating oil will be circulated over the guide bearing surfaces. Thus the present invention provides a more simple, compact and efficient guide bearing.

While the embodiment of the invention illustrated on the drawing has been described with considerable particularity, it is to be expressly understood that the invention is not limited thereto, as other embodiments will now readily suggest themselves to those skilled in the art, while changes may be made in the details of construction, arrangement, proportion, size, etc., without departing from the spirit of this invention. As before noted, the invention may be associated with any other suitable form of thrust bearing, and while one form of stationary guide bearing has been shown between the thrust block or runner and the oil retaining sleeve, any other suitable form of guide bearing construction at this location may be used, as a pivoted shoe guide bearing, a segmental type guide bearing, etc. While the inner periphery of the runner has been shown as constituting the rotatable guide bearing surface, the inner periphery of the thrust or any other suitable block may be used for this purpose if desired, and therefore when the term "rotatable thrust member" is used in the claims it is used as embracing either the thrust block or the runner. Also, as above pointed out, the block with which the guide bearing is associated need not be the rotating member of a thrust bearing, as an equivalent block may be used, with or without a thrust bearing separated therefrom, within the broader aspect of the invention. Reference is therefore to be had to the claims hereto appended for a definition of the invention.

What is claimed is:

1. In a combined thrust and guide bearing, in combination with a shaft and stationary and rotatable thrust bearing members, means providing an oil retaining well surrounding said thrust bearing members and including an inner oil retaining sleeve surrounding said shaft and projecting between it and the rotatable thrust member to provide an annular oil retaining space between said sleeve and rotatable thrust bearing member, stationary guide bearing means mounted on said sleeve and providing a stationary guide bearing surface radially spaced from the peripheral surface of said sleeve, said rotatable thrust member having a circumferential guide bearing surface at its inner periphery radially aligned with and having bearing engagement with said stationary guide bearing surface, said guide bearing surfaces being located below the oil level in said well and space and at least one guide bearing surface being provided with oil grooves to maintain a circulation of oil through said guide bearing from said well into said space, and said rotatable thrust member being provided with centrifugal pump means for withdrawing oil from said space below said oil level and delivering the same to the oil well at a rate such as to maintain said level in said space and said guide bearing surfaces submerged in oil.

2. In a combined thrust and guide bearing, in combination with a shaft and stationary and rotatable thrust bearing members, means providing an oil retaining well surrounding said thrust bearing members and including an inner oil retaining sleeve surrounding said shaft and projecting between it and the rotatable thrust member to provide an annular oil retaining space between said sleeve and rotatable thrust bearing member, stationary guide bearing means mounted on said sleeve and providing a stationary guide bearing surface radially spaced from the peripheral surface of said sleeve, said rotatable thrust member having a circumferential guide bearing surface at its inner periphery radially aligned with and having bearing engagement with said stationary guide bearing surface, said guide bearing surfaces being located below the oil level in said well and space and at least one guide bearing surface being provided with oil grooves to maintain a circulation of oil through said guide bearing from said well into said space, and said rotatable thrust member being provided with passages for centrifugally withdrawing oil from said space below said oil level and delivering the same to the oil well, said passages in said rotatable thrust member being of such size as to circulate said oil at a rate no greater than it can flow through said grooves.

3. In a combined thrust and guide bearing, in combination with a shaft and stationary and rotatable thrust bearing members, means providing an oil retaining well surrounding said thrust bearing members and including an inner oil retaining sleeve surrounding said shaft and projecting between it and the rotatable thrust member to provide an annular oil retaining space between said sleeve and rotatable thrust bearing member, stationary guide bearing means mounted on said sleeve and providing a stationary guide bearing surface radially spaced from the peripheral surface of said sleeve, said rotatable thrust member having a circumferential guide bearing surface at its inner periphery radially aligned with and having bearing engagement with said stationary guide bearing surface, said guide bearing surfaces being located below the oil level in said well and space and at least one guide bearing surface being provided with oil grooves to maintain a circulation of oil through said guide bearing from said well into said space, said rotatable thrust member being provided with passages for centrifugally withdrawing oil from said space below said oil level and delivering the same to the oil well, and means disposed in said passages for preventing said passages withdrawing oil from said space faster than the rate at which oil is circulated by said grooves.

4. In a combined thrust and guide bearing, in combination with a shaft and stationary and rotatable thrust bearing members, means providing an oil retaining well surrounding said thrust bearing members and including an inner oil retaining sleeve surrounding said shaft and projecting between it and the rotatable thrust member to provide an annular oil retaining space between said sleeve and rotatable thrust bearing member, stationary guide bearing means mounted on said sleeve and providing a stationary guide bearing surface radially spaced from the peripheral surface of said sleeve, said rotatable thrust member having a circumferential guide bearing surface at its inner periphery radially aligned with and having bearing engagement with said stationary guide bearing surface, said guide bearing surfaces being entirely disposed below the surface of the oil in said space, and said guide bearing means and said rotatable thrust member having cooperating means for maintaining a circulation of oil from said well between said guide bearing surfaces and into said space and for centrifugally removing from said space the oil that has passed between said guide bearing surfaces while maintaining the oil level in said space.

SYDNEY J. NEEDS.

REFERENCES CITED

The following references are of record in the file of this patent:

UNITED STATES PATENTS

| Number | Name | Date |
|---|---|---|
| 996,457 | Coffman | June 27, 1911 |
| 1,632,767 | Bloom | June 14, 1927 |
| 1,671,056 | Williamson | May 22, 1928 |

FOREIGN PATENTS

| Number | Country | Date |
|---|---|---|
| 530,333 | Germany | July 27, 1931 |